H. B. ADAMS.

FLUTING-MACHINE.

No. 7,229. Reissued July 18, 1876.

Witnesses:

Albert H. Hook

E. Bocklen

Inventor.

Henry B. Adams.

N. PETERS, PHOTO-LITHOGRAPHER, WASHINGTON, D. C.

UNITED STATES PATENT OFFICE.

HENRY B. ADAMS, OF NEW YORK, N. Y.

IMPROVEMENT IN FLUTING-MACHINES.

Specification forming part of Letters Patent No. 88,598, dated April 6, 1869; reissue No. 7,229, dated July 18, 1876; application filed November 18, 1874.

*To all whom it may concern:*

Be it known that I, HENRY B. ADAMS, of the city, county, and State of New York, have invented a new and useful Improvement in Fluting-Machines, of which the following is a specification, reference being had to the accompanying drawings, of which—

Figure 1:
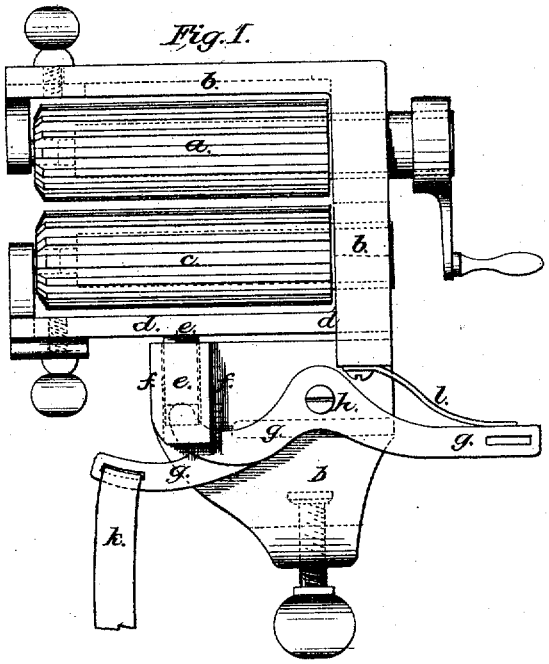
Figure 2:
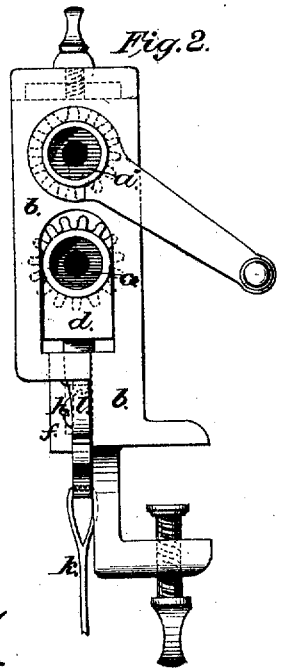

Figure 1 is a front view of a machine containing my improvement, and Fig. 2 an end view of the same.

My invention relates to a fluting-machine, composed of two fluted metal revolving rollers, mounted one over the other in a frame, one side of which only is continuous between the bearings of the rollers, the other side being open between the bearings, so that the stuff to be fluted can be introduced between the rollers at their ends, and permitting stuff of any desired width to be fluted, the upper roller revolving in fixed bearings, and the lower one in movable bearings, whereby the rollers are separated by the lower roller dropping down away from the upper roller; and consists, first, in the combination, with the lower roller, of a separate detachable yoke or frame, carrying the bearings of said lower roller, and one end of which is preferably fitted to slide in the continuous side of the frame of the machine, the other end being free; and, second, in the combination, with the said roller-frame and lever, of a strap or its equivalent, whereby force to counteract the stress of a spring and separate the rollers may be applied directly by the foot of the operator.

*a* is the upper fluted roller, and *b* the frame of the machine, the said roller being mounted to revolve in fixed bearings in said frame. *c* is the lower fluted roller, the bearings of which are in the separate detachable sliding frame or yoke *d*. The frame *b* consists of a single upright standard or pillar rising from a base, the top bar *b'* extending horizontally from said standard. In this standard one end of the upper roller *a* has its fixed bearing, the fixed bearing for the opposite end depending from the outer end of the bar *b'*. In the lower half of the said standard is an opening, as seen in Fig. 2, into which the end *d'* of the yoke *d* may be fitted to slide vertically, the said end *d'* furnishing a bearing for one end of the lower roller *c*, the opposite end of the said roller having its bearing in the opposite free end of the said yoke *d*, as seen plainly in Fig. 1. This yoke *d* may be made to slide up and down by means of a lever, *g*, whose fulcrum is at *h*. Preferably this lever is pivoted near its center, and is provided at the end *g'* with a slot or opening to receive a strap, *k*, which reaches to the floor, where, by means of a loop or treadle attached thereto, the lever can be worked by the operator's foot. It may also be worked by the operator pressing his hand directly down upon the end *g'* of the said lever. *e* is a stem, which projects downward from the center of the yoke *d*, and is fitted to slide in a stationary box or groove, *f f*, fixed to the main frame *b*, which serves to guide the yoke in its vertical movement.

The opposite end of the lever *g* may also be provided with a slot and strap, whereby force may be applied to press the lower roll against the upper roller. The said lever is also provided with a projection on the end *g'*, which enters the guide-box *f*, and abuts against the stem *e*.

*l* is a spring acting to depress the outer end of the lever *g*, and thereby press the lower roller upward against the upper one.

The operator can attach the strap *k* to either end of lever *g*. If he fixes the said strap to the left-hand end, as shown in Fig. 1, there is a spring, *l*, required to bear upon the opposite end, which spring serves to force the left-hand end of the lever up, and so lift the lower roller. Then the operator separates the two rollers by pulling the strap down by his foot, and, if he fixes the said strap to the right-hand end of lever *g*, then the spring *l* must be turned sidewise out of contact with the lever. Then the operator raises the lower roller by forcing the strap down by his foot, and he separates the two rollers from each other by lifting his foot, as the lower roller and its slide *d* will drop by their own gravity. In both cases the motion is instantaneous, and performed by the operator without taking his hands off the work.

There is an obvious advantage, recognized by all who operate fluting-machines, in having the lower roller revolve in adjustable bearings, and the upper one in fixed bearings, instead of the reverse, which is not of itself new. In the machine organized as above described this object is secured cheaply, and in a simple and effective manner.

What I claim as my invention, and desire to secure by Letters Patent, is—

1. In a fluting-machine, having the upper roller *a* in fixed bearings, and the lower roller *c* in movable bearings, a separate frame or yoke, carrying the said movable bearings, the whole mounted in a frame, the upright or standard of which, at one end of the roller only, is continuous between their bearings, provided with suitable devices for applying force to depress the said lower roller, and thereby separate it from the upper roller, all combined to operate as and for the purpose described.

2. The lower movable roller *c*, hung in a sliding yoke or frame, *d*, and the double-ended lever *g* and strap, combined and arranged to operate as and for the purpose specified.

HENRY B. ADAMS.

Witnesses:
GEO. M. RAMSAY,
A. J. DE LACY.